June 21, 1966 W. MAHRO ETAL 3,257,549
SUBTRACTING ARRANGEMENT
Filed Feb. 8, 1963 2 Sheets-Sheet 1

Inventors
Wolfgang Mahro
Elmar Götz
Peter Boese

Inventors
Wolfgang Mahro
Elmar Götz
Peter Boese
By Spencer & Kaye
Attorneys

United States Patent Office 3,257,549
Patented June 21, 1966

3,257,549
SUBTRACTING ARRANGEMENT
Wolfgang Mahro, Berlin-Charlottenburg, Elmar Götz, Frankfurt-Gravenbruch, and Peter Boese, Neu Isenburg, Germany, assignors to Licentia Patent-Verwaltungs-G.m.b.H., Frankfurt am Main, Germany
Filed Feb. 8, 1963, Ser. No. 257,185
Claims priority, application Germany, Feb. 12, 1962, L 41,214
7 Claims. (Cl. 235—175)

The present invention relates to an arrangement for subtracting one natural binary digit from another, which arrangement yields the amount of the difference and the algebraic sign thereof, the arrangement being especially suited for comparing actual and nominal values which appear as binary numbers. The term "nominal value," as hereinafter used, refers to a desired or intended value or position such as may be given by the programming of the system in which the difference between the actual and nominal values is to be measured.

There exist digitally operating control systems for various types of machinery such as work tools. It is known to carry out this digital control by storing nominal values, in the form of natural binary numbers, in suitably arranged storage devices. These nominal values may represent the position of the work tool of a machine with respect to the work piece. Similarly, the actual value of the tool may be represened by natural binary numbers. The actual and nominal values must therefore be compared so that, if necessary, the actual value may be brought to, or at least more closely to, the nominal value.

It is, therefore, an object of the present invention to provide an arrangement for subtracting one natural binary number from another, which arrangement, though inherently universal in application, is particularly adapted for effecting a digital control by comparing the actual and nominal values, which arrangement is able to yield the amount of the difference between the actual and nominal values as well as the algebraic sign of this difference. That is to say, the arrangement is intended to yield a true natural binary number, and a signal representative of the algebraic sign of the number to indicate whether the indicated difference is positive or negative. In the arrangement according to the present invention, therefore, the actual and nominal values can be applied without it being necessary to take into consideration which of the two values is larger. The present invention is furthermore such that similar structural elements can be used for each binary digit.

More particularly, the present invention relates to an arrangement for subtracting one binary number from another, which arrangement puts out the amount of the difference between the two numbers and the algebraic sign pertaining to this difference, especially for comparing actual and nominal values appearing as natural binary numbers. The present invention is characterized by the following features:

(A) Each binary digit of the binary numbers has assigned to it a subtracter for receiving two single digit binary numbers and a carry, which subtracter is controlled by a number (0 or L, where $L$=binary 1) of the minuend (e.g., the nominal value) and the same-order number (0 or L) of the subtrahend (e.g., the nominal value), as well as a carry (0 or L). (The minuend is the number from which another number is to be subtracted, while the subtrahend is the number which is to be subtracted.)

(B) If the minuend is greater than the subtrahend, there appears at the outputs of the subtracters a positive difference; if the minuend is smaller than the subtrahend, there appears at the outputs of the subtracters the complement of what will then be a negative difference.

(C) The carry which appears (0 or L) is fed back to the subtracters of the lowest-order digit for being subtracted thereat.

(D) If there is a positive difference, the result is taken directly from the outputs of the subtracters, and if there is a negative difference, the final result is not taken directly but from additional stages which are connected to the outputs of the subtracters and which invert the complement appearing thereat.

(E) The carry is used and put out for purposes of identifying the algebraic sign, i.e., to indicate whether the difference is positive or negative.

Additional objects and advantages of the present invention will become apparent upon consideration of the following description when taken in conjunction with the accompanying drawings in which.

Figure 1:
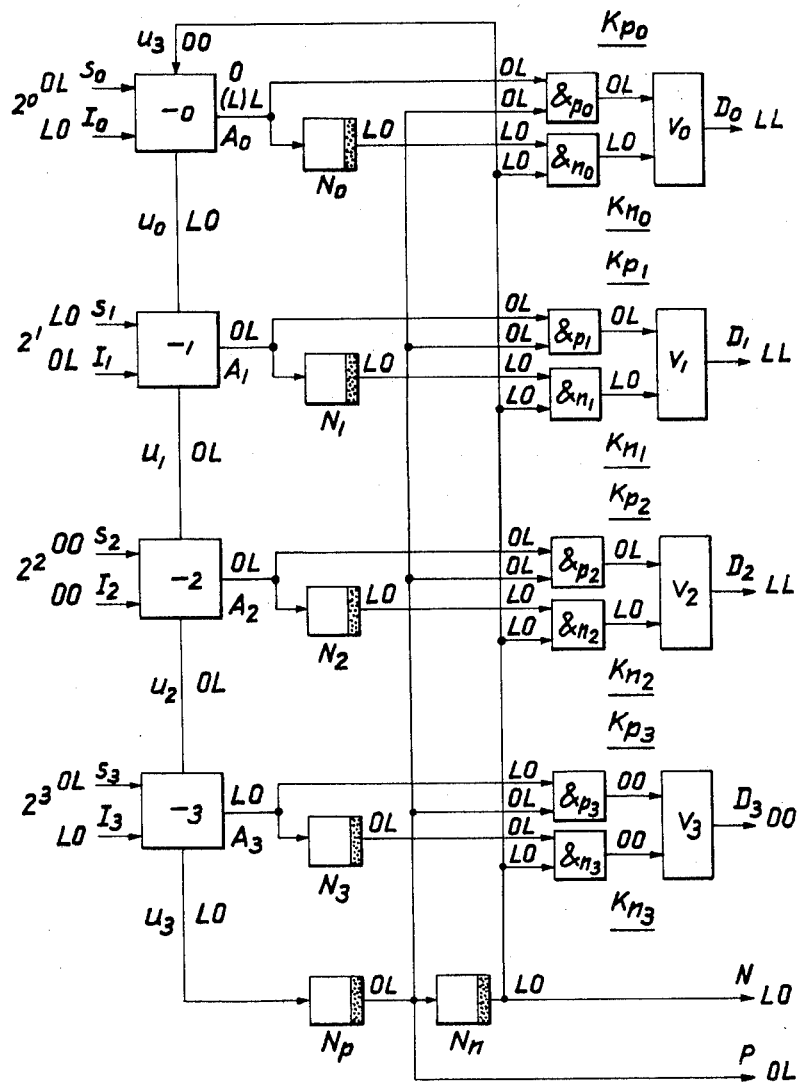
FIGURE 1 is a schematic diagram of an arrangement according to the present invention.

Referring now to the drawings and to FIGURE 1 thereof in particular, the same shows a subtracting arrangement for processing four-digit natural binary numbers which may, for example, be the nominal and actual values fed to the arrangement from a machine tool control device, it being understood that there can be as many digits as desired; in practice, a machine tool control arrangement will be expanded to handle twenty digits so that commands having a bit width of up to 20 can be processed. It is pointed out, however, that the present invention is not limited to the use of the subtracting arrangement in conjunction with machine tool controls, because the arrangement per se may be used whenever the difference between two numbers has to be determined.

The arrangement depicted in FIGURE 1 comprises one subtracting device $-_0$, $-_1$, $-_2$, $-_3$, for each binary digit $2^0$, $2^1$, $2^2$, $2^3$. Each subtracter has three inputs. The first of these inputs has applied to it the binary number $S_0$, $S_1$, $S_2$, $S_3$ (0 or L), coming from the storage devices which contain the nominal values; the second input has applied to it the binary number $I_0$, $I_1$, $I_2$, $I_3$ (0 or L), representing the actual value; and the third input has applied to it a respective carry $u_3$, $u_0$, $u_1$, $u_2$ (0 or L) coming from another subtracter.

The carry circuits of the subtracters are galvanically coupled to each other, as indicated by the leads and the NOT-amplifiers $N_p$, $N_n$. The outputs $A_0$, $A_1$, $A_2$, $A_3$, of the subtracters are applied, within each digit, to two pulsable channels $K_{p0}$, $K_{p1}$, $K_{p2}$, $K_{p3}$, and $K_{n0}$, $K_{n1}$, $K_{n2}$, $K_{n3}$, channel $K_p$ being constituted by pulsable gates in the form of AND-circuits $\&_{p0}$, $\&_{p1}$, $\&_{p2}$, $\&_{p3}$, and channel $K_n$ being constituted by NOT-circuits $N_0$, $N_1$, $N_2$, $N_3$, and pulsable gates in the form of AND-circuits $\&_{n0}$, $\&_{n1}$, $\&_{n2}$, $\&_{n3}$. The outputs of the two channels are applied to OR-circuits $v_0$, $v_1$, $v_2$, $v_3$, at whose outputs $D_0$, $D_1$, $D_2$, $D_3$, appears the amount of the difference between the nominal and actual values. Signals can be obtained from the outputs N, P, of the NOT-amplifiers $N_n$, $N_p$, which indicate the algebraic sign of the difference appearing at outputs $D_0$ through $D_3$. The two NOT-amplifiers $N_p$, $N_n$, are serially connnected. An input signal L appearing at the input of NOT-amplifier $N_p$ appears as the signal 0 at the output P thereof, while an input signal 0 will produce the output signal L. The NOT-amplifier $N_n$ operates in the same manner. Inasmuch as there is a double negation of the signal appearing at the input of amplifier $N_p$, the signal appearing at output N of amplifier $N_n$ will be of the same phase as the input signal appearing at $N_p$. Thus, if the input to $N_p$ is L, there is an output signal L at N. The output signals at N, P, of these two amplifiers serve to indicate the algebraic sign of the difference appearing at the outputs $D_0$ through $D_3$ of the OR-circuits. The output signals at P and N also control the AND-circuits of the channels $K_p$ and $K_n$.

The operation of the above-described comparison circuit will now be explained by means of two numerical examples.

Assume that the nominal value 00L0 (=decimal 2) appears at the inputs $S_0$ through $S_3$ while the value L00L (=decimal 9) appears at the inputs $I_0$ through $I_3$, the subtracters $-_0$ through $-_3$ being assumed to represent the orders $2^0$ through $2^3$, respectively, and the above-mentioned values 00L0 and L00L being indicated at the left of the respective inputs. (Note that since, in FIGURE 1, the highest-order digit is shown at the bottom and the lowest-order digit at the top, the values 00L0 and L00L must be read from bottom to top.)

It is also assumed that in the starting position of the arrangement, the carry $u_3$ applied to the subtracter $-_0$ is 0. This subtracter subtracts the actual value $I_0=L$ from the nominal value $S_0=0$. This produces the value L at output $A_0$, as shown in parentheses. The subtraction also produces an outgoing carry $u_0=L$, as indicated.

The subtracter $-_1$ subtracts the actual value $I_1=0$ from the nominal value $S_1=L$, which produces L. From this value, the amount of the carry $u_0=L$ still remains to be subtracted, and this produces the value 0 at output $A_1$. The outgoing carry $u_1=0$.

In subtracter $-_2$, the actual value $I_2=0$ is subtracted from the nominal value $S_2=0$. The incoming carry $u_1=0$ does not change this. The value 0 thus appears at output $A_2$, the outgoing carry $u_2$ being 0.

In subtracter $-_3$, the actual value $I_3=L$ is subtracted from the nominal value $S_3=0$, the incoming carry $u_2$ being 0. The output at $A_3$ is L, there being an outgoing carry $u_3=L$. This carry $u_3=L$ is applied to the input of the NOT-amplifier $N_p$. The signal 0 thus appears at the positive output P, while the signal at the negative output N is L. This shows that the difference obtained is a negative difference.

As is shown in FIGURE 1, the outputs of amplifiers $N_p$, $N_n$, are applied to the AND-circuits of the output channels $K_p$, $K_n$. The output P of NOT-amplifier $N_p$ controls the AND-circuits $\&_{p0}$ through $\&_{p3}$. These AND-circuits are blocked, i.e., do not pass on a signal, because the output signal at P is 0. At the same time, the output signal N of the NOT-amplifier $N_n$ is L, thereby opening the AND-circuits $\&_{n0}$ through $\&_{n3}$. The signal L appearing at the output N of $N_n$ corresponds to the carry $u_3=L$. A like signal is thus applied via $N_p$, $N_n$, to the lowest-order subtracter $-_0$. Consequently, the signal appearing at the third or carry input is now no longer 0, but L, as a result of which the output value at $A_0$, originally indicated, in parentheses, as L is now changed from L to 0 because the subtracter $-_0$ now subtracts 0 minus L minus $L=0$, it being this last-mentioned value which ultimately appears at $A_0$.

now subtracts 0 minus L minus $L=0$, it being this last-mentioned value which ultimately appears at $A_0$.

The values now appearing at $A_0$ through $A_3$ will thus be L000 (again reading upwardly). This number represents not the difference but the complement of the difference between the smaller nominal value and the larger actual value.

(It is pointed out, in this connection, that the term "complement," as used throughout the instant specification and claims, is intended to refer to the so-called "base-minus-one" complement common in computer technology, rather than the so-called "true complement." For instance, the "base-minus-one" complement of L000 is 0LLL, while the "true complement" of L000 would be L000, namely, the number which has to be added to the original amount so as to give the least number containing one more digit.)

These output values reach, firstly, the AND-circuits $\&_{p0}$ through $\&_{p3}$ of channels $K_p$ and, secondly, the NOT-circuits $N_0$ through $N_3$ of channels $K_n$. As stated above, the AND-circuits $\&_{p0}$ through $\&_{p3}$ are in any event blocked, so that whatever values appear at the outputs of the subtracters can not possibly be passed on through the stages of the channels $K_p$. The NOT-circuits $N_0$ through $N_3$ affirm and hence invert the complement values, so that the outputs of these NOT-circuits will be 0LLL (still reading upwardly).

As explained above, the AND-circuits $\&_{n0}$ through $\&_{n3}$ of channels $K_n$ already have one of their inputs provided with a positive signal L, thanks to the carry $u_3=L$ of the subtracter $-_3$, and are thus ready to pass on any signals which come to them from the NOT-circuits $N_0$ through $N_3$. Consequently, the signals 0LLL appearing at the outputs of these NOT-circuits are passed on through the AND-circuits $\&_{n0}$ through $\&_{n3}$.

For the reason set forth above, the outputs of AND-circuits $\&_{p0}$ through $\&_{p3}$ of channels $K_p$ will be 0; since the outputs of AND-circuits $\&_{n0}$ through $\&_{n3}$ will be 0LLL, the signals appearing at outputs $D_0$ through $D_3$ of the OR-circuits $v_0$ through $v_3$ will be 0LLL (reading upwardly) corresponding to decimal 7, which, it will be appreciated, corresponds to the difference of 00L0 (decimal 2) minus L00L (decimal 9). The algebraic sign of this difference is identified as negative by the signal L appearing at the negative output N.

The above example assumed that the nominal value appearing at the inputs $S_0$ through $S_3$ was smaller than the actual value appearing at the inputs $I_0$ through $I_3$. In this case, the difference appearing at outputs $D_0$ through $D_3$ appeared as an absolute binary number, with the negative algebraic sign of the difference represented by this number being indicated by the appearance of the signal L at the negative output N.

If the applied nominal value is larger than the applied actual value, the subtracters carry out a normal subtraction. This is illustrated by the next example (shown at the right of the previous example), in which the nominal value is now L00L (decimal 9) and the actual value 00L0 (decimal 2), which values are again noted next to the respective inputs (again reading from the bottom up).

The subtracter $-_0$ subtracts 0 from L, the incoming carry again being assumed to be 0. The output at $A_0$ is therefore L and the outgoing carry $u_0=0$.

The subtracter $-_1$ subtracts L from 0, thereby producing at $A_1$ the value L, as well as a carry $u_1=L$.

The subtracter $-_2$ subtracts 0 from 0, and due to the incoming carry $u_1=L$, L is subtracted from 0 so as to produce at $A_2$ the value L, the outgoing carry $u_2$ being likewise L.

The subtracter $-_3$ subtracts 0 from L, and due to the incoming carry $u_2=L$, L is subtracted from L so as to produce at $A_3$ the value 0, the outgoing carry $u_3$ being 0.

At the output P of $N_p$ appears the signal L which indicates that the difference appearing at outputs $D_0$ through $D_3$ is a positive difference. The signal L of output P is also applied to AND-circuits $\&_{p0}$ through $\&_{p3}$ of channels $K_p$, thereby opening these circuits. The AND-circuits $\&_{n0}$ through $\&_{n3}$ of channels $K_n$ are controlled by the signal 0 coming from output N of the NOT-amplifier $N_n$. This signal 0 is thus applied as the incoming carry $u_3$ to the subtracter $-_0$; this carry $u_3=0$, of course has no effect on the result L appearing at output $A_0$ of subtracter $-_0$.

The result 0LLL (decimal 7) of this subtraction thus appears directly at the outputs $A_0$ through $A_3$ of the subtracters. These values are also applied to the opened AND-circuits $\&_{p0}$ through $\&_{p3}$ of channels $K_p$, and hence to one input of each of the OR-circuits $v_0$ through $v_3$, so as to appear at the outputs $D_0$ through $D_3$ as 0LLL (decimal 7), as a numerical difference. The signal L appearing at positive output P indicates that the difference appearing at outputs $D_0$ through $D_3$ is a positive difference.

It will be seen from the above that the arrangement according to the present invention comprises a series of subtracters each of which is assigned to a respective order. Each subtracter has a number output A, a carry output $u$, input means S for receiving a digit from the minuend, input means I for receiving a digit from the subtrahend which is of the same order as the digit from the minuend, and input means for receiving the carry coming from the carry output of the subtracter assigned to the next lower order, except, of course, insofar as the lowest-order subtracter $-_0$ is concerned which receives the carry output from the subtracter $-_3$ assigned to the highest order. As a result, there is produced at the number outputs $A_0$ through $A_3$ of the subtracters the difference between the two numbers if the minuend is greater than the subtrahend, the difference under these circumstances being positive, while the signals appearing at the number outputs $A_0$ through $A_3$ will be the complement of the difference between the two numbers if the minuend is smaller than the subtrahend, which means that the difference is negative.

The arrangement further includes what may be termed the algebraic sign output means, namely, the NOT-circuits $N_p$ and $N_n$ which are connected to the carry output $u_3$ of the subtracter $-_3$ assigned to the highest order. The algebraic sign output means produce a signal which is indicative of the present or absence of a carry at this carry output $u_3$ and hence indicative of whether the difference appearing at the number outputs of the subtracters is positive or negative. In particular, the output N produces a signal when there is a carry (L) at $u_3$, while the output P produces a signal if there is no carry (0) at $u_3$.

Furthermore, the OR-circuits $v_0$ through $v_3$ serve as difference output means; the channels $K_{p0}$ through $K_{p3}$, which are connected to output P of the algebraic sign output means, apply whatever positive difference appears at the number outputs of the subtracters to the difference output means, while the channels $K_{n0}$ through $K_{n3}$, which are connected to output N of the algebraiic sign outputs means, first invert whatever complement of a negative difference appears at the number outputs of the subtracters and then apply the thus-inverted complement to the difference output means.

Figure 2:
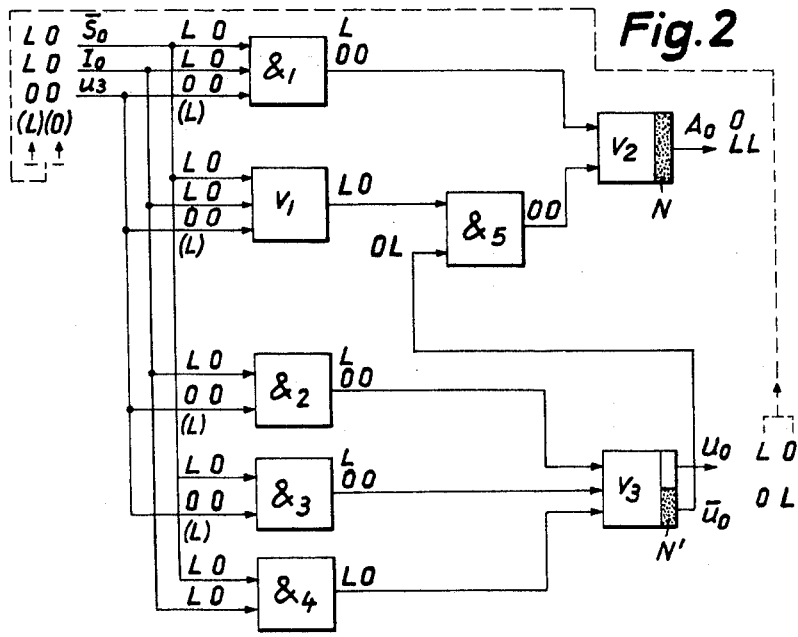
FIGURE 2 is a schematic diagram of one embodiment of a subtracter usable in the arrangement of FIGURE 1.

FIGURE 2 shows one embodiment of a subtracter which may be used in the circuit of FIGURE 1. The subtracter comprises five AND-circuits $\&_1$, $\&_2$, $\&_3$, $\&_4$, $\&_5$ and three OR-circuits $v_1$, $v_2$, $v_3$. The OR-circuit $v_2$ has its output connected to a NOT-circuit N and the OR-circuit $v_3$ has its output connected to an OR/NOT-circuit N'. The inputs of the subtracters are shown at $\bar{S}_0$, $I_0$, and $u_3$, the output being shown at $A_0$ and the outgoing carry at $u_0$. As shown in FIGURE 2, the OR-circuit $v_2$ is combined with the NOT-circuit N to form an OR/NOT-circuit having a negated output, while the OR-circuit $v_3$ is combined with the OR/NOT-circuit N' to form an OR/OR NOT-circuit also having affirmed and negated outputs.

The detailed description and the operation of the circuit will now be presented, it being assumed that the nominal and actual value inputs are the same as those which are marked at the left of FIGURE 1 next to the corresponding inputs of the subtracter $-_0$.

As shown in FIGURE 2, it is the negated signal $\bar{S}_0 = L$ rather than the signal 0 of input $S_0$ of FIGURE 1 which is applied to the input of the subtracter. This signal is readily derived from the signal $S_0 = 0$ of FIGURE 1 by means of a conventional NOT-circuit (not shown). It is again assumed that the carry $u_3$ is initially equal to 0. The signal $I_0$ has the value L. These signals LL0 are applied to the first AND-circuit $\&_1$, at whose output appears the value 0. The signals $\bar{S}_0$, $I_0$, and $u_3$ are also applied to the OR-circuit $v_1$, so that there appears at the output of this OR-circuit the signal L. The AND-circuit $\&_2$ has applied to it the signals $I_0$ and $u_3$ having the values 0 and L, respectively. The output of this AND-circuit is thus 0. The AND-circuit $\&_3$ has applied to it the signals $\bar{S}_0$ and $u_3$ having the values L and 0, respectively, so that the output of this AND-circuit is 0. The AND-circuit $\&_4$ has applied to it the signals $\bar{S}_0$ and $I_0$ each of which has the value L, so that the output of this AND-circuit is L.

The outputs of AND-circuits $\&_2$, $\&_3$, $\&_4$, are applied to the inputs of OR-circuit $v_3$, whose output is, as stated above connected to the OR/NOT-circuit N'. The signal L appears at the affirmed output $u_0$ of N' and the signal 0 appears at the negated output $\bar{u}_0$. This negated signal 0 of output $\bar{u}_0$ is applied to the AND-circuit $\&_5$, the other input of which already has applied to its the signal L coming from OR-circuit $v_1$. Thus, there appears at the output of AND-circuit $\&_5$ the signal 0. Consequently, there are two signals 0 applied to the inputs of OR-circuit $v_2$, and the output $A_0$ of the NOT-circuit N will therefore present the signal L.

As explained above in connection with FIGURE 1, the outgoing carry which is $u_0$ in FIGURE 2, should, for purposes of subtraction, be reintroduced into the subtracter of the lowest order digit. For the sake of simplicity, let it be assumed that $u_0 = u_3$ so that the carry $u_0 = u_3 = L$ is applied to the nput $u_3$, as shown in FIGURE 2 in dashed lines. This is represented at the input $u_3$ by the valve L shown in parentheses. In this way, all of the input signals $\bar{S}_0$, $I_0$, $u_3$ of AND-circuit $\&_1$ equal L. Consequently, the output of AND-circuit $\&_1$ will present the signal L, as indicated above the 0 which was up to now assumed to be the output of AND-circuit $\&_1$. The fed back carry signal $u_0 = L$ has no effect on the OR-circuit $v_1$ because the other input of this OR-circuit already had the signal L applied to it. The AND-circuits $\&_2$, $\&_3$, are now activated because of the carry $u_3 = L$ so that their outputs will change from 0 to L, as indicated above the previous 0's. The output L of AND-circuit $\&_4$ remains unchanged. Also, the signal L of the carry $u_0$ of OR-circuit $v_3$ remains unchanged, as does the output 0 of AND-circuit $\&_5$. However, inasmuch as the output of AND-circuit $\&_1$ has changed from 0 to L, the output signal $A_0$ also changes from L to 0, as indicated above the previous 0.

It will be seen that the subtraction carried out corresponds to that of subtracter $-_0$ of FIGURE 1.

FIGURE 2 also shows the second numerical example given in FIGURE 1. Accordingly, the signals L for the lowest binary number of the nominal value $S_0$ and 0 for the binary number of the actual value $I_0$ are again noted at the subtracter of FIGURE 2. The signal L applied to $S_0$ in the arrangement of FIGURE 1 is, in FIGURE 2, changed to a signal 0 because of $S_0$. The output of AND-circuit $\&_1$ presents the signal 0, as does the output of OR-circuit $v_1$. The outputs of AND-circuits $\&_2$, $\&_3$, $\&_4$, likewise present the signal 0. The outgoing carry $u_0$ is 0. The negated signal L at the output $\bar{u}_0$ of the OR/NOT-circuit N' is applied to AND-circuit $\&_5$, at whose output there appears the signal 0. The input signals of OR-circuit $v_2$ are 0 and at the output $A_0$ of the NOT-circuit N appears the value L.

The outgoing carry $u_0 = 0$ is applied, via the line shown in dashed lines, to the input $u_3$. Inasmuch as this carry $u_3$ was already assumed to be 0 in the starting position of the circuit, this actual signal 0 effects no change on any of the components.

It will be seen from the above that the operation of the subtracters may be expressed, in Boolean algebra, as follows:

$$[(\overline{S}_0 \vee I_0 \vee u_3) \& \overline{u}_0] \vee [\overline{S}_0 \& I_0 \& u_3] = A_0$$

$$(\overline{S}_0 \& I_0) \vee (\overline{S}_0 \& u_3) \vee (I_0 \& u_3) = u_0$$

If desired, it is possible to use instead of the negated input signal $\overline{S}_0$ and the affirmed input signals $I_0$, $u_3$, an affirmed input signal $S_0$ and negated input signals $\overline{I}_0$, $\overline{u}_3$.

Figure 3:
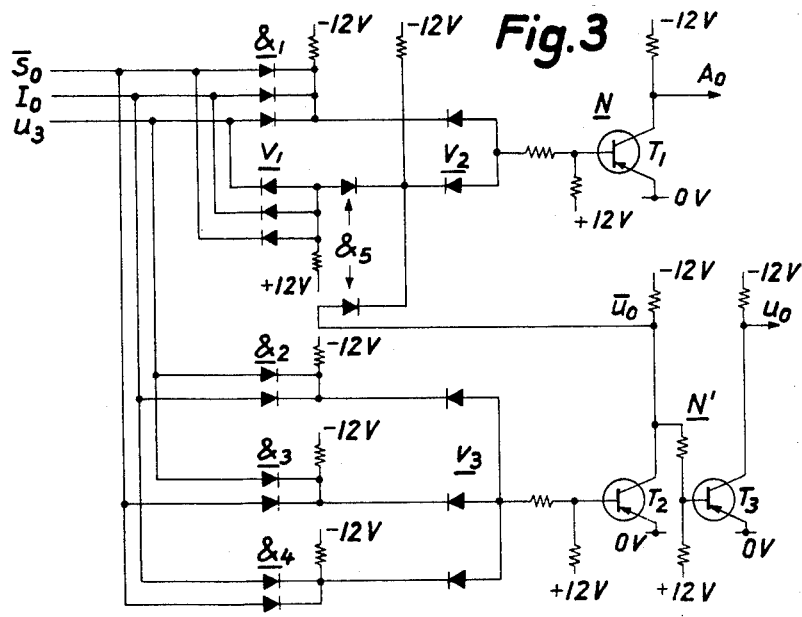
FIGURE 3 is a circuit diagram of a subtracter usable in the arrangement of FIGURE 1.

FIGURE 3 is a circuit diagram of a subtracter such as may be used in the arrangement of FIGURE 1. The subtracter is made up substantially exclusively of diodes constituting the various AND-circuits and OR-circuits, together with the operating resistances, a transistor $T_1$ operating as the NOT-circuit N from whose number output $A_0$ the result is taken off, and two further transistors $T_2$, $T_3$, having the outputs $\overline{u}_0$, $u_0$, this two-stage switching amplifier N' being controlled by the OR-circuit $v_3$.

The circuit is fed by a positive and a negative direct current voltage of approximately 12 volts. As shown in FIGURE 3, all of the electrical components are galvanically coupled to each other so that the entire circuit is insensitive to external noise pulses or voltages. The binary numbers 0 or 1 are realized by corresponding D.C. voltage signals which are not called upon to meet any particular specification. In the illustrated circuit, the binary number 1 corresponds, for example, to a D.C. voltage signal of −12 volts (0 volts being the reference) and the binary number 0 corresponds to a D.C. voltage signal of about 0 volt.

It will be understood that the above description of the present invention is susceptible to various modifications, changes, and adaptations, and the same are intended to be comprehended within the meaning and range of equivalents of the appended claims.

What is claimed is:

1. An arrangement for subtracting a binary subtrahend from a binary minuend, which arrangement puts out the amount of the difference between the two numbers and a signal representative of the algebraic sign of said difference, said arrangement comprising, in combination:
   (a) a series of subtracters each being assigned to a respective order, each subtracter except the one assigned to the lowest order having
      (1) a number output,
      (2) a carry output,
      (3) input means for receiving a digit from the minuend,
      (4) input means for receiving a digit from the subtrahend which is of the same order as the digit from the minuend, and
      (5) input means for receiving the carry coming from the carry output of the subtracter assigned to the next lower order;
   the subtracter assigned to the lowest order having
      (1) a number output,
      (2) a carry output,
      (3) input means for receiving the lowest-order digit from the minuend,
      (4) input means for receiving the lowest-order digit from the subtrahend, and
      (5) input means for receiving the carry coming from the carry output of the subtracter assigned to the highest order
   so that there is produced at said number outputs of said subtracters the difference between the two numbers if the minuend is greater than the subtrahend and the difference is therefore positive, and the complement of the difference between the two numbers if the minuend is smaller than the subtrahend and the difference is therefore negative;
   (b) algebraic sign output means connected to the carry output of said subtracter assigned to the highest order for producing a signal which is indicative of the presence or absence of a carry at said last-mentioned carry output and hence indicative of whether the difference appearing at said number outputs of said subtracters is positive or negative;
   (c) difference output means;
   (d) means responsive to said algebraic sign output means for applying a positive difference appearing at said number outputs of said subtracters to said difference output means; and
   (e) means responsive to said algebraic sign output means for inverting the complement of a negative difference appearing at said number outputs of said subtracters and applying the thus-inverted complement to said difference output means.

2. An arrangement as defined in claim 1 wherein said algebraic sign output means has a first output for producing a signal when there is a carry appearing at the carry output of said subtracter of the highest order and a second output for producing a signal when there is no carry appearing at said last-mentioned carry output.

3. An arrangement as defined in claim 2 wherein said means (d) comprise a series of channels each being assigned to a respective order, each channel comprising a logic circuit having a first input connected to the output of the respective subtracter, a second input connected to said second output of said algebraic sign output means, and an output connected to an input of said difference output means.

4. An arrangement as defined in claim 2 wherein said means (e) comprise a series of channels each being assigned to a respective order, each channel comprising an inverting circuit having an input connected to the output of the respective subtracter, and a logic circuit having a first input connected to the output of the inverting circuit, a second input connected to said first output of said algebraic sign output means, and an output connected to an input of said difference output means.

5. An arrangement as defined in claim 1 wherein each of said subtracters comprises logic circuit means operating according to the following function:

$$[(\overline{S}_0 \vee I_0 \vee u_3) \& \overline{u}_0] \vee [\overline{S}_0 \& I_0 \& u_3] = A_0$$

$$(\overline{S}_0 \& I_0) \vee (\overline{S}_0 \& u_3) \vee (I_0 \& u_3) = u_0$$

6. An arrangement as defined in claim 1 wherein each of said subtracters comprises logic circuit means operating according to the following function:

$$[(S_0 \vee \overline{I}_0 \vee \overline{u}_3) \& \overline{u}_0] \vee [S_0 \& \overline{I}_0 \& \overline{u}_3] = A_0$$

$$(S_0 \& \overline{I}_0) \vee (S_0 \& \overline{u}_3) \vee (\overline{I}_0 \& \overline{u}_3) = u_0$$

7. An arrangement as defined in claim 1 wherein each of said subtracters comprises:
   (A) a first AND-circuit for receiving the digits of the numbers and a composite carry signal derived from another subtracter and from the carry of the subtracter itself;
   (B) an OR-circuit for receiving the digits of the numbers and said composite carry signal;
   (C) a second AND-circuit for receiving the digits of the numbers;
   (D) a third AND-circuit for receiving one of the digits and said composite carry signal;
   (E) a fourth AND-circuit for receiving the other of said digits and said composite carry signal;
   (F) an OR/OR NOT-circuit having its inputs connected to the outputs of said second, third and fourth AND-circuits, said OR/OR NOT-circuit having affirmed and negated outputs, said affirmed outputs constituting the carry output of the respective subtracter;
   (G) a fifth AND-circuit having one input connected to the output of said OR-circuit and another input connected to said negated output of said OR/OR NOT-circuit; and
   (H) an OR/NOT-circuit having one input connected to the output of said first AND-circuit and another input connected to the output of said fifth AND-circuit, the output of said OR/NOT-circuit constituting the number output of the respective subtracter.

References Cited by the Examiner

UNITED STATES PATENTS 2,907,877  10/1959  Johnson _____ 235—177
3,010,654  11/1961  Ketchledge _____ 235—175
3,033,459   5/1962  Saylor _____ 235—168

R. C. BAILEY, *Primary Examiner.*

M. J. SPIVAK, *Assistant Examiner.*